US009292906B1

(12) United States Patent
Binder et al.

(10) Patent No.: US 9,292,906 B1
(45) Date of Patent: Mar. 22, 2016

(54) TWO-DIMENSIONAL IMAGE PROCESSING BASED ON THIRD DIMENSION DATA

(71) Applicant: Google Inc., Mountain View, CA (US)

(72) Inventors: Thomas Binder, Lübeck (DE); Nils Kokemohr, Hamburg (DE); Manuel Willie, Lubeck (DE)

(73) Assignee: Google Inc., Mountain View, CA (US)

( * ) Notice: Subject to any disclaimer, the term of this patent is extended or adjusted under 35 U.S.C. 154(b) by 54 days.

(21) Appl. No.: 14/019,808

(22) Filed: Sep. 6, 2013

(51) Int. Cl.
*G06T 5/00* (2006.01)

(52) U.S. Cl.
CPC ................................. *G06T 5/001* (2013.01)

(58) Field of Classification Search
CPC . H04N 13/00; H04N 13/0022; H04N 13/026; H04N 19/597; H04N 13/0007; G06T 7/2066; G06T 2007/10028; G06T 5/001
USPC ........... 382/285, 260; 348/46, 47, 136, 222.2, 348/135; 358/1.9
See application file for complete search history.

(56) References Cited

U.S. PATENT DOCUMENTS

| | | | |
|---|---|---|---|
| 6,728,421 B2* | 4/2004 | Kokemohr | .................... 382/284 |
| 6,865,300 B2 | 3/2005 | Kokemohr | |
| 7,031,546 B2 | 4/2006 | Maeda | |
| 2007/0003134 A1* | 1/2007 | Song et al. | .................... 382/154 |
| 2010/0166338 A1* | 7/2010 | Lee et al. | .................... 382/285 |
| 2011/0074931 A1* | 3/2011 | Bilbrey et al. | .................. 348/48 |
| 2011/0123068 A1* | 5/2011 | Miksa | ..................... G06T 5/002 382/105 |
| 2012/0014456 A1* | 1/2012 | Martinez Bauza et al. | ........................ 375/240.25 |
| 2012/0050264 A1* | 3/2012 | Karaoguz et al. | ............. 345/419 |
| 2012/0050484 A1* | 3/2012 | Boross et al. | .................... 348/46 |
| 2012/0050490 A1* | 3/2012 | Chen et al. | ........................ 348/47 |
| 2012/0242829 A1* | 9/2012 | Shin et al. | ..................... 348/135 |
| 2013/0016900 A1* | 1/2013 | Kim | .......................... G06T 5/20 382/162 |
| 2013/0027396 A1* | 1/2013 | Jiang | ...................... H04N 13/00 345/419 |
| 2013/0033713 A1* | 2/2013 | Patana et al. | .................... 358/1.9 |
| 2013/0106848 A1* | 5/2013 | Nguyen | ............. H04N 13/0011 345/419 |
| 2013/0135298 A1* | 5/2013 | Isogai et al. | .................. 345/419 |

(Continued)

FOREIGN PATENT DOCUMENTS

EP            1449152        10/2013

OTHER PUBLICATIONS

Thomas Binder et al., "Design of user interfaces for selective editing of digital photos on touchscreen devices",Proceedings SPIE 8667 (Multimedia Content and Mobile Devices), SPIE (2013) published Mar. 7, 2013.*

(Continued)

*Primary Examiner* — Mekonen Bekele

(57) ABSTRACT

Systems, methods and computer readable media for two-dimensional image processing based on third dimension data are described. Some implementations can include a method comprising obtaining first image data having a plurality of pixel values and obtaining second image data corresponding to each pixel value in the first image data. The method can also include receiving an indication of one or more control points in the first image data. The method can further include selectively filtering the first image data based on a distance from the control point and on one or more data values in the second image data corresponding to the corresponding control point. The method can also include outputting the selectively filtered first image data.

24 Claims, 3 Drawing Sheets

(56) References Cited

U.S. PATENT DOCUMENTS

| | | | |
|---|---|---|---|
| 2013/0222633 A1* | 8/2013 | Knight et al. ............... | 348/222.1 |
| 2014/0092221 A1* | 4/2014 | Nagai ................ | H04N 13/0022 |
| | | | 348/51 |
| 2014/0232820 A1* | 8/2014 | Ha ....................... | H04N 13/026 |
| | | | 348/43 |
| 2014/0240492 A1* | 8/2014 | Lee .............................. | 348/136 |

OTHER PUBLICATIONS

T. Binder, M. Steiding, M. Wille, N. Kokemohr, Design of user interfaces for selective editing of digital photos on touchscreen devices, Proceedings SPIE vol. 8667 (Multimedia Content and Mobile Devices), 86671N (2013).

* cited by examiner

TWO-DIMENSIONAL IMAGE PROCESSING BASED ON THIRD DIMENSION DATA

BACKGROUND

Digital images may include a two-dimensional array of image data values such as brightness and color. Selective processing of images (e.g., spatially varying filter parameters or filter strength) can be accomplished with conventional image processing software. However, such selective processing can become cumbersome and time-consuming whenever high accuracy is required.

In addition to the two-dimensional array, a third dimension (or n-dimension) array of data values can be associated with an image. A user may desire to perform one or more selective image processing functions on the two-dimensional image based on data values in the third dimension array.

Also, increasingly, digital images are taken with mobile devices such as wireless phones and tablet computers, which often have touch screen input devices. A user may desire to perform an image processing function via a user interface configured for mobile devices and/or touch screen input devices.

SUMMARY

Some implementations relate generally to image processing, and, more particularly, to methods, systems and computer readable media for two-dimensional image processing based on third dimension data.

Some implementations can include a method comprising obtaining first data having a plurality of pixel values and obtaining second data having one or more values corresponding to each pixel value in the first data and receiving an indication of one or more control points in the first data. The method can also include selectively filtering the first data based on one or more data values in the second data corresponding to the one or more control points. The method can further include outputting the selectively filtered first data.

The first data can include two-dimensional data and the second data includes depth map data. Alternatively, the first data can include two-dimensional image data and the second data includes data from a different radiant spectrum than the first data.

The selective image filtering can be performed based on values received from on-image user interface controls superimposed on a displayed portion of the first data, wherein each on-image user interface control corresponds to one of the control points. The selectively filtered first data can include the second data. The selective image filtering can be performed based on values received from user interface controls displayed in a place different than superimposed on a displayed portion of the first data.

Some implementations can include a system having one or more computers configured to perform operations. The operations can include obtaining first image data having a plurality of pixel values and obtaining second image data corresponding to each pixel value in the first image data. The operations can also include receiving an indication of a control point in the first image data. The operations can further include selectively filtering the first image data based on a distance from the control point and on one or more data values in the second image data corresponding to the control point. The operations can also include outputting the selectively filtered first image data.

In some implementations, the first image data can include two-dimensional image data and the second image data includes depth map data. In some implementations, the first image data includes two-dimensional image data and the second image data includes image data from a different spectrum than the first image data.

The selective image filtering can be performed based on values received from on-image user interface controls superimposed on a displayed portion of the first image data. The selectively filtered first image data can include the second image data. The selective image filtering can be performed based on values received from user interface controls displayed in a place different than superimposed on a displayed portion of the first image data.

Some implementations can include a nontransitory computer readable medium having software instructions stored thereon that, when executed by a processor, cause the processor to perform operations. The operations can include obtaining first image data having a plurality of pixel values and obtaining second image data corresponding to each pixel value in the first image data. The operations can also include receiving an indication of a control point in the first image data. The operations can further include selectively filtering the first image data based on a distance from the control point and on one or more data values in the second image data corresponding to the control point. The operations can also include outputting the selectively filtered first image data.

In some implementations, the first image data can include two-dimensional image data and the second image data includes depth map data. In some implementations, the first image data includes two-dimensional image data and the second image data includes image data from a different spectrum than the first image data.

The selective image filtering can be performed based on values received from on-image user interface controls superimposed on a displayed portion of the first image data. The selectively filtered first image data can include the second image data. The selective image filtering can be performed based on values received from user interface controls displayed in a place different than superimposed on a displayed portion of the first image data.

DETAILED DESCRIPTION

Figure 1:
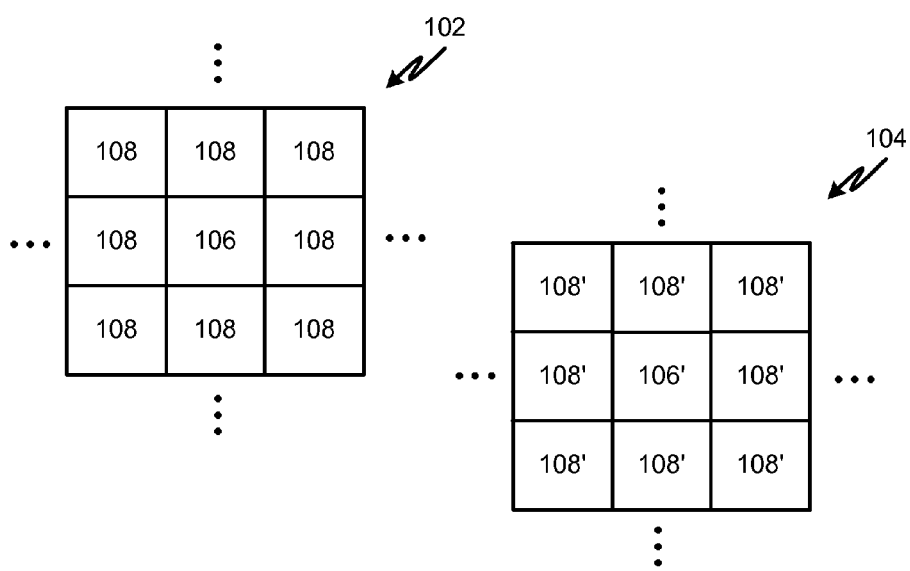
FIG. 1 is a diagram of example first image data and second image data in accordance with some implementations.

FIG. 1 is a diagram of example first data and second data in accordance with some implementations. The first data 102 can include a two-dimensional image array of image data values (e.g., brightness and color values). The first data 102 can also include a pixel corresponding to a selected control point 106 (or image reference point). The first data can also include pixels 108 that are a distance from the pixel corresponding to the control point 106. It will be appreciated that a first set of distant pixels (108) is shown for illustration purposes, but that image data may include other pixels at other distances from the pixel corresponding to a control point. Also, it will be appreciated that there may be more than one control point.

The second data 104 can include a third (or more) dimension of data values in an array corresponding to the data values in the first data 102. The second data 104 can include a pixel 106' corresponding to the control point (and to the pixel 106 in the first data 102). The second image data can also include a set of pixels (108') a distance from the pixel 106' corresponding to the control point (and to the pixels 108 in the first data 102).

The second data 104 can include a depth map. A depth map can be an image or an image channel that contains information relating to the distance of the surfaces of objects in the image scene from a viewpoint. Depth map is related to, and may be analogous to, depth buffer, Z-buffer, Z-buffering and Z-depth. The "Z" in some of the above-mentioned terms follows a convention that the central axis of view of a camera is referred to as the camera's Z axis, which may be the same as, or different than, the absolute Z axis of the scene of an image.

Depth cues can be obtained from additional time-of-flight cameras mounted with the main imaging camera, camera arrays (e.g., stereo), moving a single camera while in burst mode or video mode, a focus stack, or even a flash/no flash image pair.

Also, while examples are discussed herein in terms of actual depth information from a real world scene, it will be appreciated that an implementation can be used with computer generated graphics. Additional information (e.g., depth) may be readily available and accurate in computer graphics as it may be coming from a computer generated 3D scene, for example.

Alternatively, the second data 104 can include image data from a spectrum different than the spectrum of the first data 102. For example, the second data 104 can include values representing one or more of gamma radiation, x-ray radiation, ultraviolet radiation, visible radiation (if the first image data is not in the visible spectrum), infrared radiation, terahertz radiation, microwave radiation and radio waves. The second image data could also include data obtained by a neighborhood operation on the image, such as texturedness or noisiness. Also, the second image data could include data that may be unrelated to pixels or radiance in any spectrum, e.g., population density or other demographic or statistical data. It will be appreciated that the first data 102 can include one or more of the types of data mentioned above regarding the second data 104. Also, it will be appreciated that while the term "image data" is used for illustration purposes, the image data could include data that is not necessarily visible, e.g., a depth map, radiation data or other n-dimensional data. In general, the phrase "image data" refers to an array of data having one or more dimensions.

Figure 2:
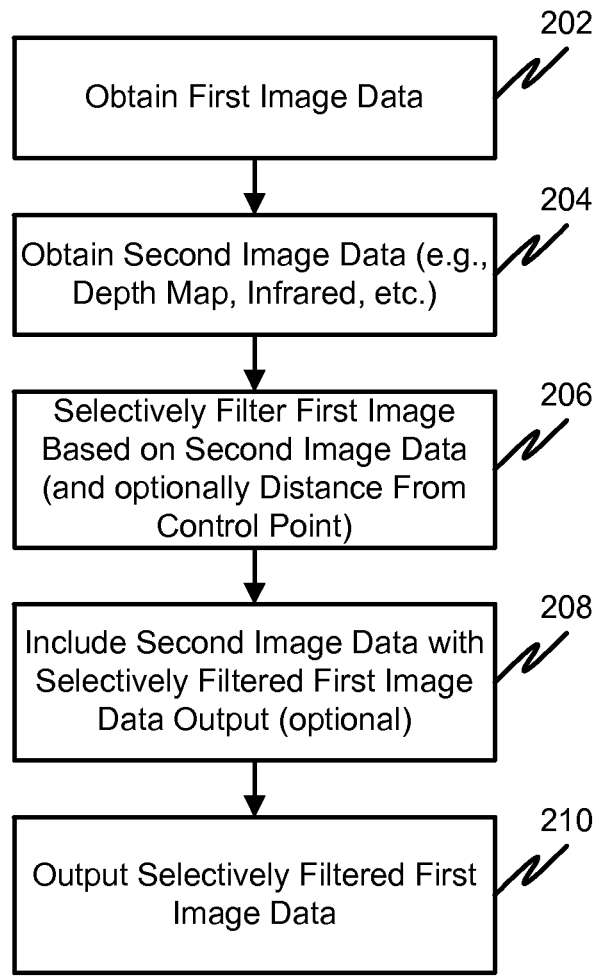
FIG. 2 is a flow chart of an example method for two-dimensional image processing based on third dimension data in accordance with some implementations.

FIG. 2 is a flow chart of an example method 200 for two-dimensional image processing based on third dimension data in accordance with some implementations. Processing begins at 202, where first image data is obtained. For example, first image data may be obtained from an image sensor (e.g., camera) in a user device. Alternatively, the first image data may be obtained by receiving transmitted data from another device or system via a wired or wireless connection. Processing continues to 204.

At 204, second image data is obtained. The second image data may be obtained from a second sensor (e.g., depth measuring device, alternate spectrum sensor for sensing one or more of gamma radiation, x-ray radiation, ultraviolet radiation, visible radiation, infrared radiation, terahertz radiation, microwave radiation and radio waves, or the like) in the user device. Alternatively, the second image data may be obtained by receiving transmitted data from another device or system via a wired or wireless connection. Processing continues to 206.

At 206, the first image data is selectively filtered (or processed) based on one or more selected control points (or image reference points) and/or data values from the second image data. For example, an indication of one or more control points can be received. As used herein, control point can refer to an on-screen user interface element that indicates a location of where an image processing function will be performed. Also, control point can refer to a location in a data array (e.g., in first data and second data) that corresponds to a selected point in an image. The control point can have an effect on the image processing function in two respects. First, the image processing function can be performed with respect to distance from the control point (e.g., the image processing function can vary according to the distance from the control point). For example, the intensity or amplitude of an image processing function can decrease as a function of distance from the control point.

Second, the image processing function can be performed based on image data from a pixel value in the second image data corresponding to the location of the control point in the first image data. For example, if the second image data is a depth map and the control point corresponds to a depth map value of 5 feet, an image processing function may be to blur all pixels in the first image with a radius proportional to the the absolute value of the difference of the pixel's depth map value and 5 feet.

Also, a combination of two or more image processing functions can be applied at each control point and each control point can have a different set of one or more image processing functions that are being applied at that control point.

In other words, 2D selective processing can be performed based on a 3D data model. For example, the availability of the 3D data model can provide improved approaches for selective processing with filters such as blur, saturation, relighting, and selective white balance, among others. Also, it will be appreciated that the additional data could have more than a single dimension, which makes the data model n-dimensional, where n>=3. In some implementations, the selective processing could be performed based only on the data values from the second image data without regarding to the distance from the control point.

In general, filter parameters or filter strength can be spatially varied based on the control point location and/or data values from the second image data. Systems and methods for providing control point functionality (or image reference point functionality) and associated on-image user interface controls are described in U.S. Pat. Nos. 6,728,421; 6,865,300; and 7,031,547, which are incorporated herein by reference. Processing continues to 208.

At 208, the second image data is optionally included with the selectively processed first image data. For example, the second image data could be provided with the processed first image data to enable further downstream processing. Processing continues to 210.

At 210, the selectively processed image is provided as output. The selective processed image can be displayed, stored and/or transmitted to another system or device via a wired or wireless network. It will be appreciated that 202-210 can be repeated in whole or in part in order to accomplish a contemplated image processing task.

Figure 3:
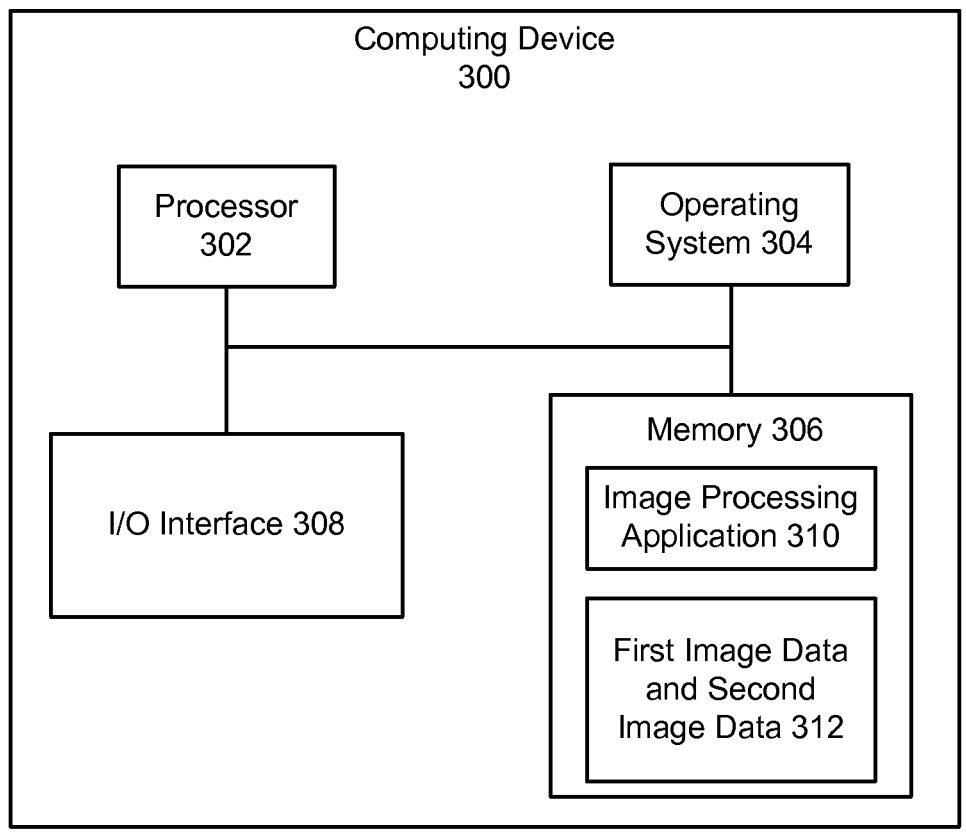
FIG. 3 is a diagram of an example computer system in accordance with some implementations.

FIG. 3 is a diagram of an example computer device 300 that can be used for two-dimensional image processing based on third dimension data in accordance with some implementations. The computer device 300 includes a processor 302, operating system 304, memory 306 and I/O interface 308.

The memory 306 can include an image processing application 310 and one or more images (or data arrays) 312.

In operation, the processor 302 may execute the image processing application 310 stored in the memory 306. The image processing application 310 can include software instructions that, when executed by the processor, cause the processor to perform operations for two-dimensional image processing based on third dimension data in accordance with the present disclosure (e.g., the image processing application 310 can cause the processor to perform one or more of steps 202-210 described above and, in conjunction, can access the first and second image data 312). The image processing application 310 can also operate in conjunction with the operating system 304.

The computer (e.g., 300) can include, but is not limited to, a single processor system, a multi-processor system (co-located or distributed), a cloud computing system, or a combination of the above.

The user device can include, but is not limited to, a desktop computer, a laptop computer, a portable computer, a tablet computing device, a smartphone, a feature phone, a personal digital assistant, a media player, an electronic book reader, an entertainment (or computing) system of a vehicle or the like. Other examples of devices include computing and/or display systems built into windows, walls, furniture, glasses, goggles, wrist watches, clothing or the like. In general, any computing device capable of implementing one or more of the methods described herein can be used.

The network connecting user devices to a conversation server can be a wired or wireless network, and can include, but is not limited to, a WiFi network, a local area network, a wide area network, the Internet, or a combination of the above.

The data storage, memory and/or nontransitory computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for performing one or more image processing tasks as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for two-dimensional image processing based on third dimension data.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
    obtaining first data having a plurality of pixel values and obtaining second data having one or more values corresponding to each pixel value in the first data, wherein the second data is independent of the first data;
    receiving an indication of one or more control points in the first data;
    selectively filtering the first data based on one or more data values in the second data corresponding to the one or more control points; and
    outputting the selectively filtered first data,
    wherein the selective filtering is performed based on values received from on-image user interface controls superimposed on a displayed portion of the first data, and wherein each on-image user interface control corresponds to one of the control points.

2. The method of claim 1, wherein the first data includes two-dimensional data and the second data includes depth map data.

3. The method of claim 1, wherein the first data includes two-dimensional image data and the second data includes data from a different radiant spectrum than the first data.

4. The method of claim 1, wherein the selectively filtered first data includes the second data.

5. A system comprising:
    one or more computers configured to perform operations including:
        obtaining first image data having a plurality of pixel values and obtaining second image data corresponding to each pixel value in the first image data, wherein the second data is independent of the first data;
        receiving an indication of at least one control point in the first image data;
        selectively filtering the first image data based on a distance from the at least one control point and on one or more data values in the second image data corresponding to the at least one control point; and
        outputting the selectively filtered first image data,
        wherein the selective image filtering is performed based on values received from at least one on-image user interface control superimposed on a displayed portion of the first image data, wherein the at least one on-image user interface control corresponds the at least one control point.

6. The system of claim 5, wherein the first image data includes two-dimensional image data and the second image data includes depth map data.

7. The system of claim 5, wherein the first image data includes two-dimensional image data and the second image data includes image data from a different spectrum than the first image data.

8. The system of claim 5, wherein the selectively filtered first image data includes the second image data.

9. A nontransitory computer readable medium having software instructions stored thereon that, when executed by a processor, cause the processor to perform operations comprising:
    obtaining first image data having a plurality of pixel values and obtaining second image data corresponding to each pixel value in the first image data, wherein the second data is independent of the first data;
    receiving an indication of a control point in the first image data;
    selectively filtering the first image data based on a distance from the control point and on one or more data values in the second image data corresponding to the control point; and
    outputting the selectively filtered first image data,
    wherein the selective image filtering is performed based on values received from an on-image user interface control superimposed on a displayed portion of the first image data, wherein the on-image user interface control corresponds to the control point.

10. The nontransitory computer readable medium of claim 9, wherein the first image data includes two-dimensional image data and the second image data includes depth map data.

11. The nontransitory computer readable medium of claim 9, wherein the first image data includes two-dimensional image data and the second image data includes image data from a different spectrum than the first image data.

12. The nontransitory computer readable medium of claim 9, wherein the selectively filtered first image data includes the second image data.

13. A method comprising:
obtaining first data having a plurality of pixel values and obtaining second data having one or more values corresponding to each pixel value in the first data;
receiving an indication of one or more control points in the first data;
selectively filtering the first data based on one or more data values in the second data corresponding to the one or more control points; and
outputting the selectively filtered first data,
wherein the selective image filtering is performed based on values received from user interface controls displayed in a place different than superimposed on a displayed portion of the first data.

14. The method of claim 13, wherein the first data includes two-dimensional data and the second data includes depth map data.

15. The method of claim 13, wherein the first data includes two-dimensional image data and the second data includes data from a different radiant spectrum than the first data.

16. The method of claim 13, wherein the second data is independent of the first data.

17. A system comprising:
one or more computers configured to perform operations including:
obtaining first image data having a plurality of pixel values and obtaining second image data corresponding to each pixel value in the first image data;
receiving an indication of at least one control point in the first image data;
selectively filtering the first image data based on a distance from the at least one control point and on one or more data values in the second image data corresponding to the at least one control point; and
outputting the selectively filtered first image data,
wherein the selective image filtering is performed based on values received from user interface controls displayed in a place different than superimposed on a displayed portion of the first image data.

18. The system of claim 17, wherein the first image data includes two-dimensional image data and the second image data includes depth map data.

19. The system of claim 17, wherein the first image data includes two-dimensional image data and the second image data includes image data from a different spectrum than the first image data.

20. The system of claim 17, wherein the second data is independent of the first data.

21. A nontransitory computer readable medium having software instructions stored thereon that, when executed by a processor, cause the processor to perform operations comprising:
one or more computers configured to perform operations including:
obtaining first image data having a plurality of pixel values and obtaining second image data corresponding to each pixel value in the first image data;
receiving an indication of a control point in the first image data;
selectively filtering the first image data based on a distance from the control point and on one or more data values in the second image data corresponding to the selected control point; and
outputting the selectively filtered first image data,
wherein the selective image filtering is performed based on values received from user interface controls displayed in a place different than superimposed on a displayed portion of the first image data.

22. The nontransitory computer readable medium of claim 21, wherein the first image data includes two-dimensional image data and the second image data includes depth map data.

23. The nontransitory computer readable medium of claim 21, wherein the first image data includes two-dimensional image data and the second image data includes image data from a different spectrum than the first image data.

24. The nontransitory computer readable medium of claim 21, wherein the second data is independent of the first data.

* * * * *